Figure 1:
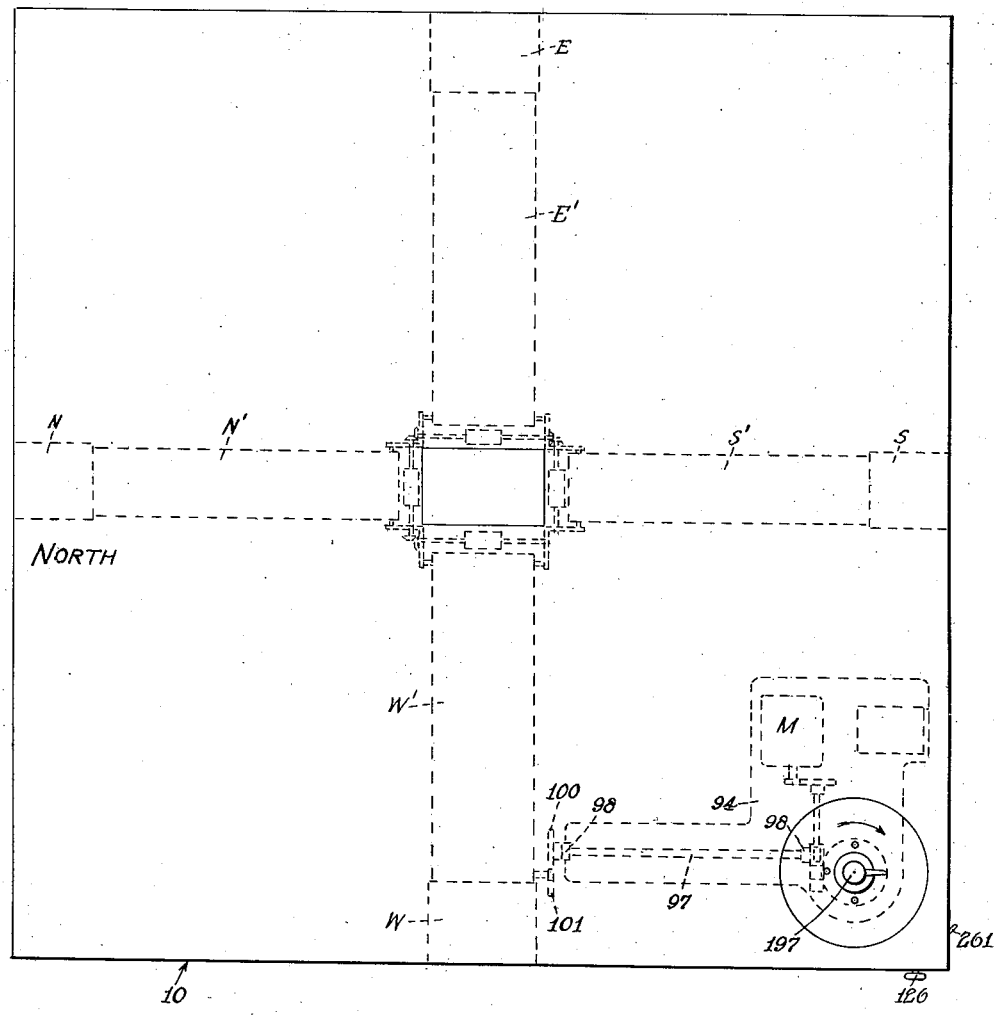

Aug. 18, 1936.　　　　W. C. MILES　　　　2,051,615
PLAYING CARD DEALING APPARATUS
Filed June 23, 1933　　　9 Sheets-Sheet 1

INVENTOR
William C. Miles
BY
William Richolson
ATTORNEYS

Aug. 18, 1936.  W. C. MILES  2,051,615
PLAYING CARD DEALING APPARATUS
Filed June 23, 1933   9 Sheets-Sheet 2

INVENTOR
William C. Miles
BY
Williams, Reid, [illegible]
ATTORNEYS

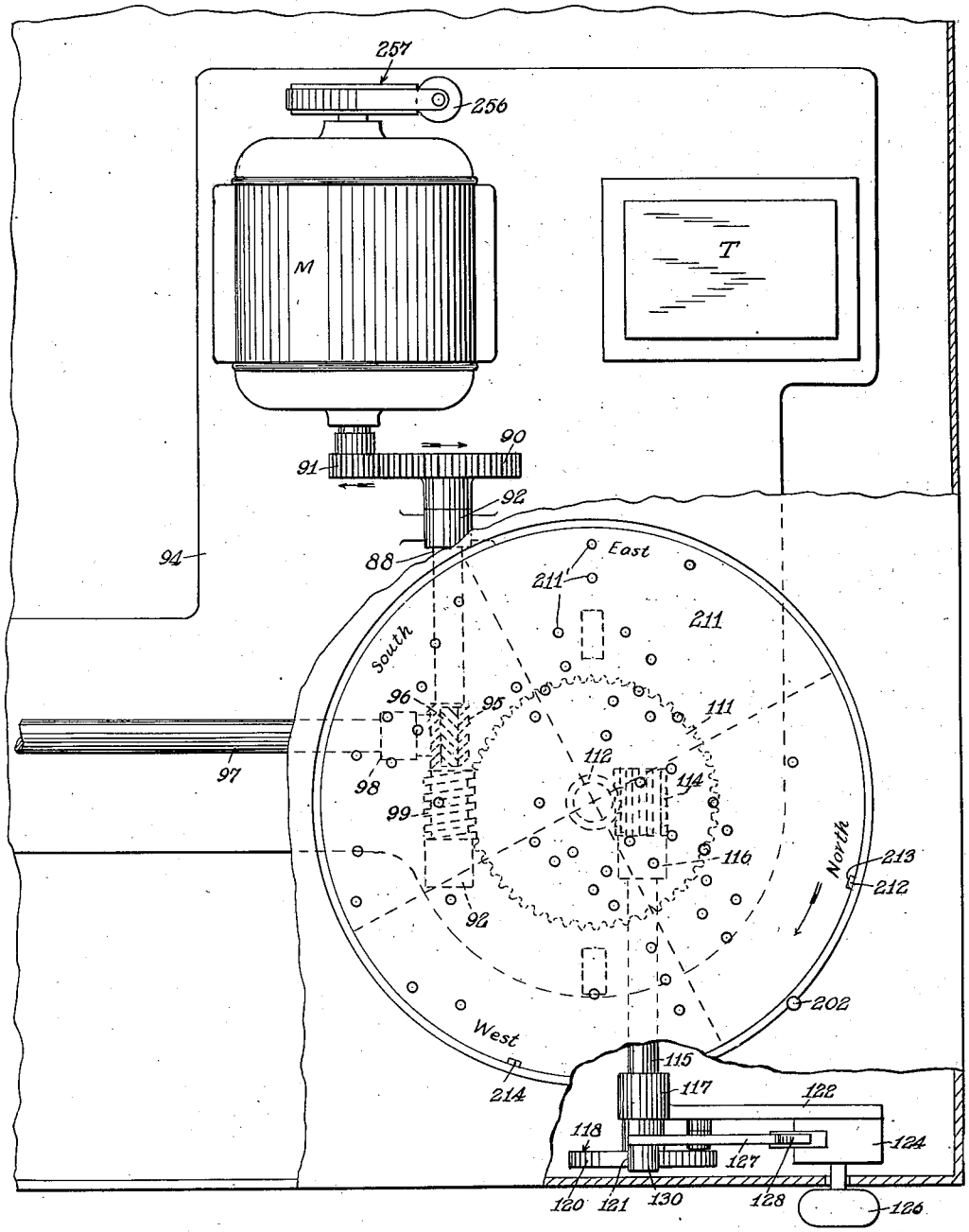

Aug. 18, 1936.  W. C. MILES  2,051,615
PLAYING CARD DEALING APPARATUS
Filed June 23, 1933  9 Sheets-Sheet 4
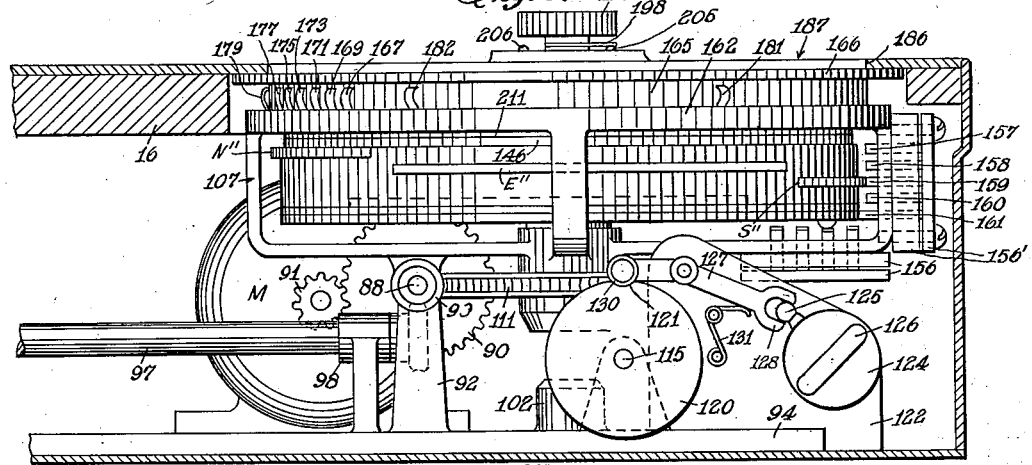
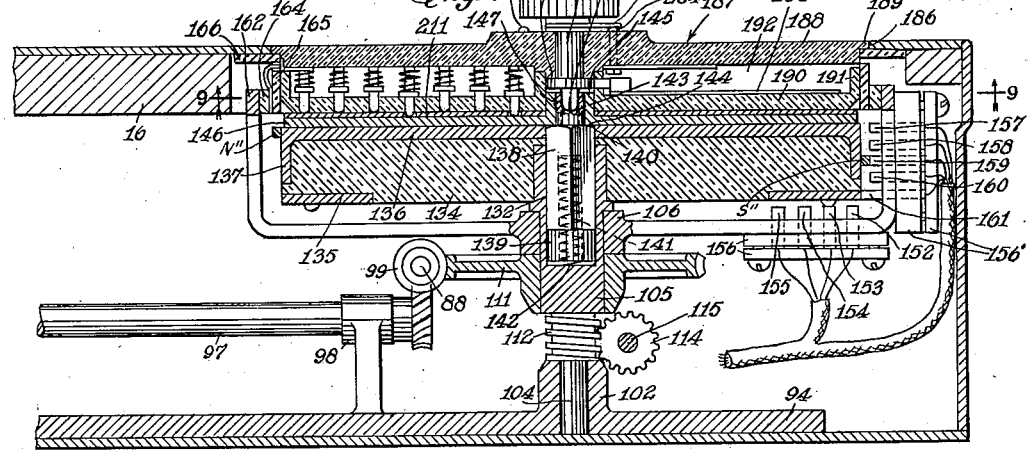
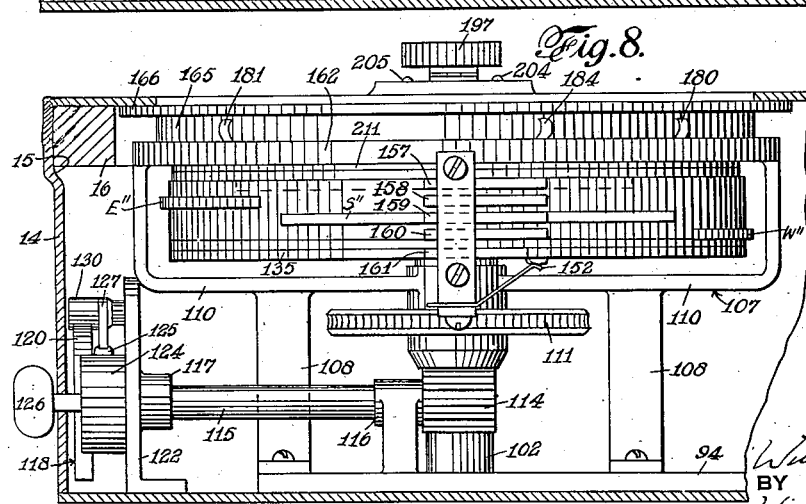
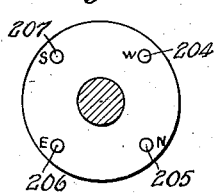
INVENTOR
William C. Miles
BY
Williams, Bird & Brown
ATTORNEYS Aug. 18, 1936.   W. C. MILES   2,051,615
PLAYING CARD DEALING APPARATUS
Filed June 23, 1933   9 Sheets-Sheet 5

INVENTOR
William C. Miles
BY
Williams, Rich & Morse
ATTORNEYS

Aug. 18, 1936.  W. C. MILES  2,051,615
PLAYING CARD DEALING APPARATUS
Filed June 23, 1933  9 Sheets-Sheet 6
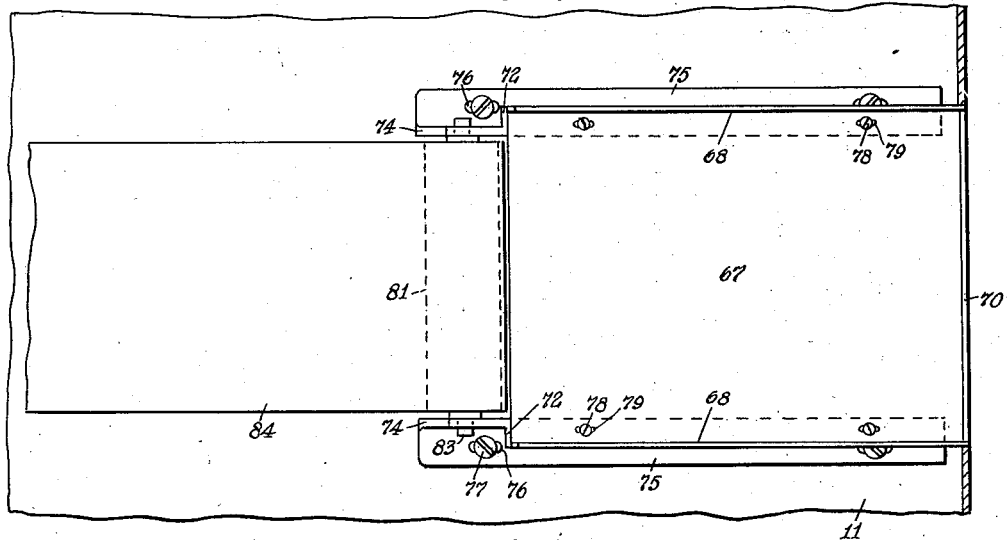
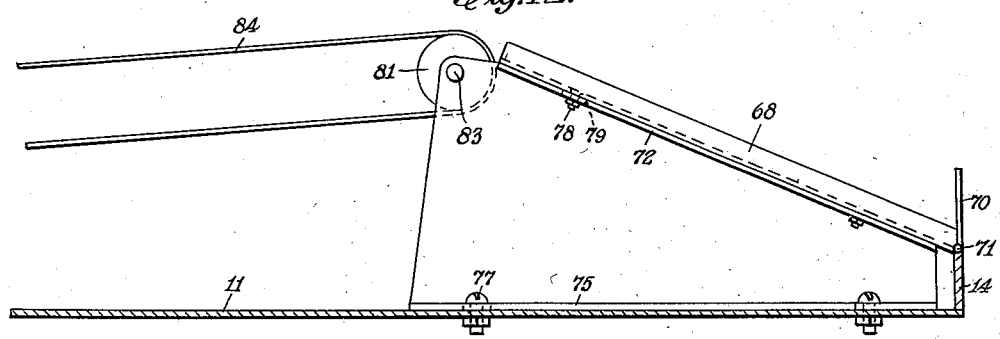
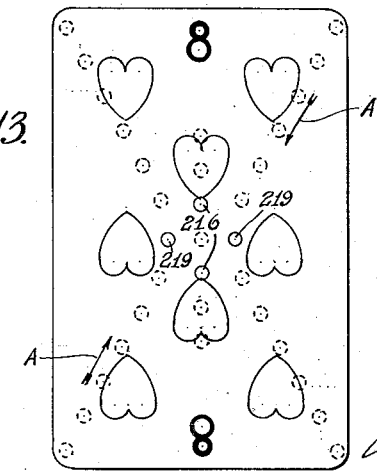
INVENTOR.
William C. Miles
BY
Williams, Rich & Morse
ATTORNEYS Aug. 18, 1936. W. C. MILES 2,051,615
PLAYING CARD DEALING APPARATUS
Filed June 23, 1933 9 Sheets-Sheet 7

INVENTOR
William C. Miles
BY
William Rich
ATTORNEYS

Aug. 18, 1936.  W. C. MILES  2,051,615
PLAYING CARD DEALING APPARATUS
Filed June 23, 1933   9 Sheets-Sheet 8

INVENTOR
BY
ATTORNEYS

Aug. 18, 1936.　　　　W. C. MILES　　　　2,051,615
PLAYING CARD DEALING APPARATUS
Filed June 23, 1933　　　9 Sheets-Sheet 9
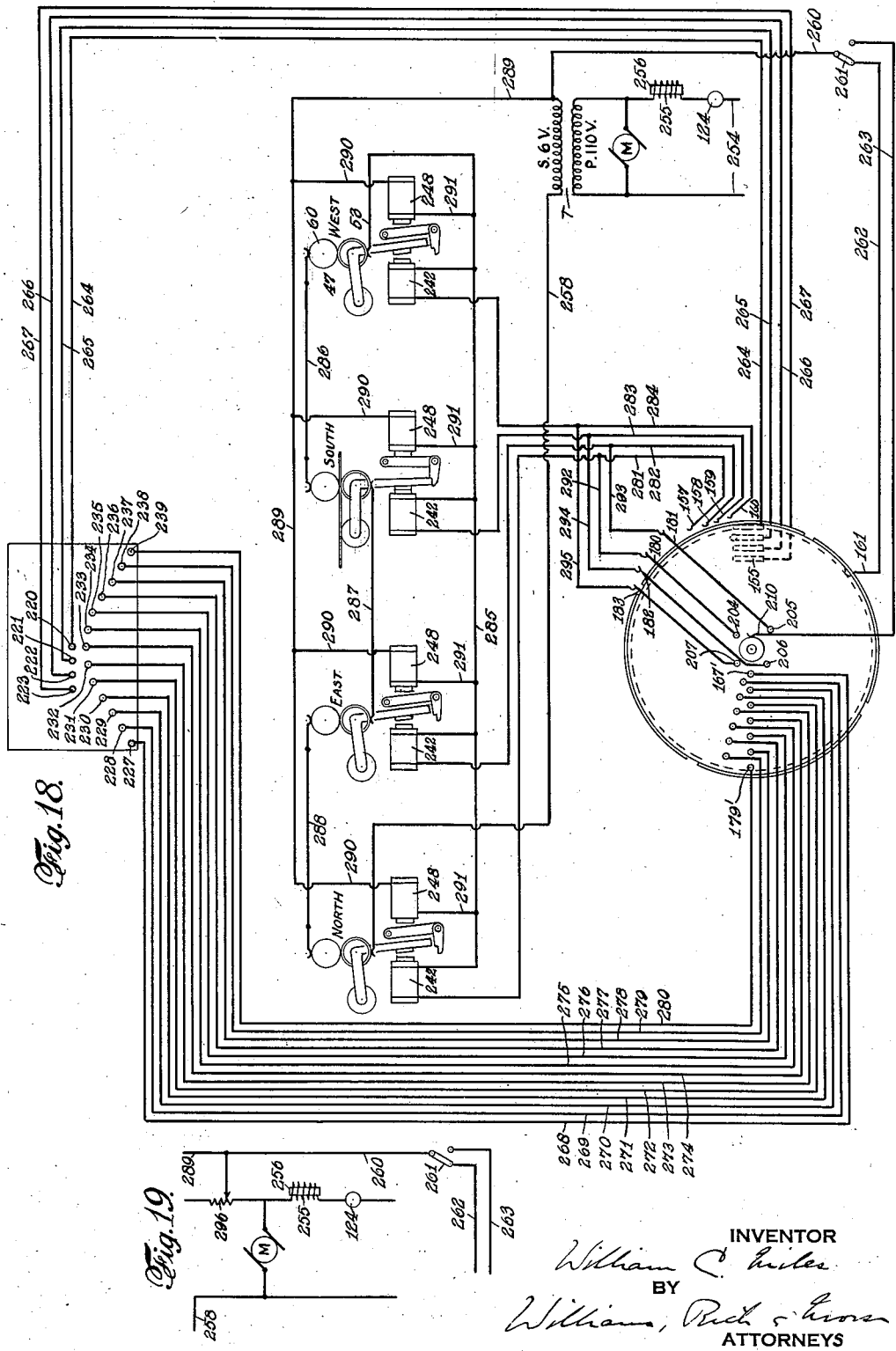

Patented Aug. 18, 1936

2,051,615

UNITED STATES PATENT OFFICE 2,051,615

PLAYING-CARD DEALING APPARATUS

William C. Miles, White Plains, N. Y.

Application June 23, 1933, Serial No. 677,236

27 Claims. (Cl. 273—149)

This invention relates to card sorting machines, and is herein illustrated as embodied in a playing-card dealing apparatus admirably adapted for use in the dealing of bridge hands.

Concerning the game of bridge as played today, there are two outstanding variations—one being known as "duplicate" bridge and the other as "rubber" bridge.

In the playing of duplicate bridge, it is essential that provision shall be made to enable the North-South partners to hold the identical hands previously held by the East-West partners, and to that end it has been customary to employ a series of decks of cards and a corresponding number of what are commonly known as "duplicate boards", into the pockets of which are placed the cards constituting, respectively, the hands of North, South, East and West on the first half-play and, respectively, the hands of East, West, South and North on the second half-play so that relative partnership skill may be determined with a fair degree of accuracy for a given contest.

As to rubber bridge, however, the cards are dealt to the respective players North, East, South and West without intent to allot to any partners, for example North-South, any hands previously dealt to their opponents West-East, the successive complete deals being made by the players in rotation.

An important object of the present invention is to provide a simple, reliable, and otherwise highly satisfactory apparatus, for use in connection with the playing of duplicate games such as duplicate bridge, by which predetermined hands may be automatically dealt to the respective players, North-South, East-West, on a given deal and by which such hands may be duplicated on another deal, so that the partners North-South may hold the hands previously held by the partners West-East and so that the partners East-West may hold the hands previously held by the partners North-South.

Another object of the invention is to provide means in an apparatus of the character mentioned, whereby the apparatus may be rendered ineffective with respect to the dealing and duplication of predetermined hands and at the same time rendered effective as an instrumentality for automatically dealing the cards to the respective players North, East, South, West, without exercising any control over the distribution of the cards in so far as their suit or their denominational values are concerned.

Other objects and advantages of the invention will become apparent from the following description taken in connection with the accompanying drawings in which—

Figure 2:
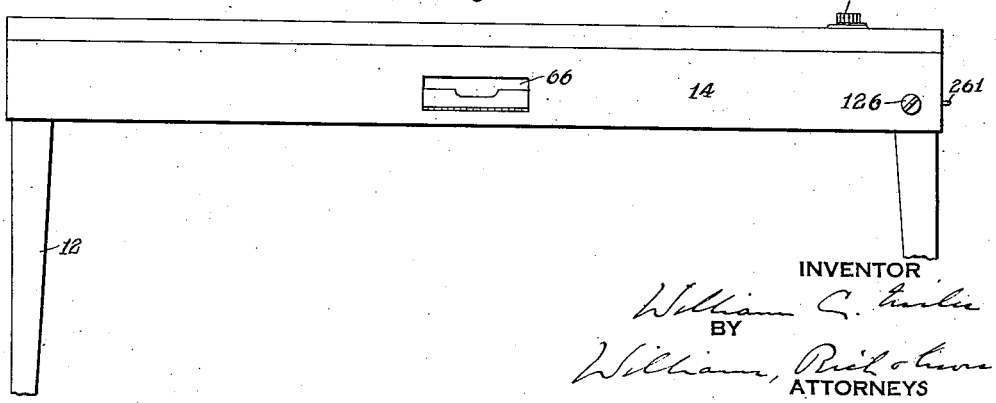
Figure 3:
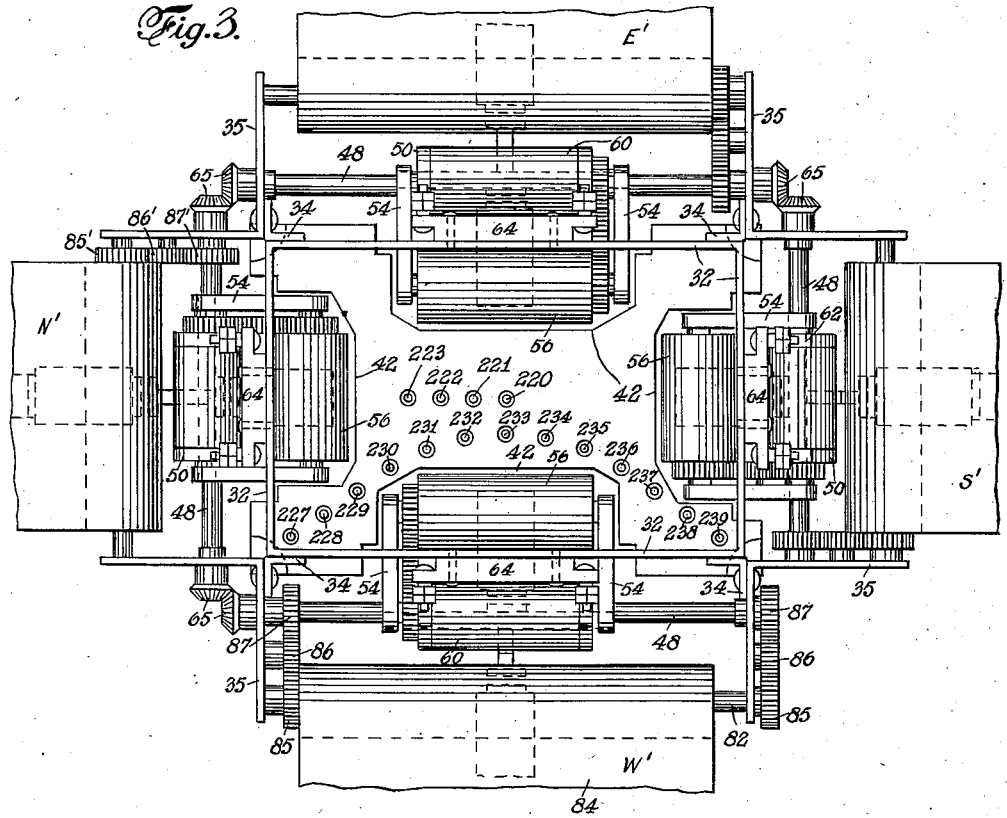
Figure 4:
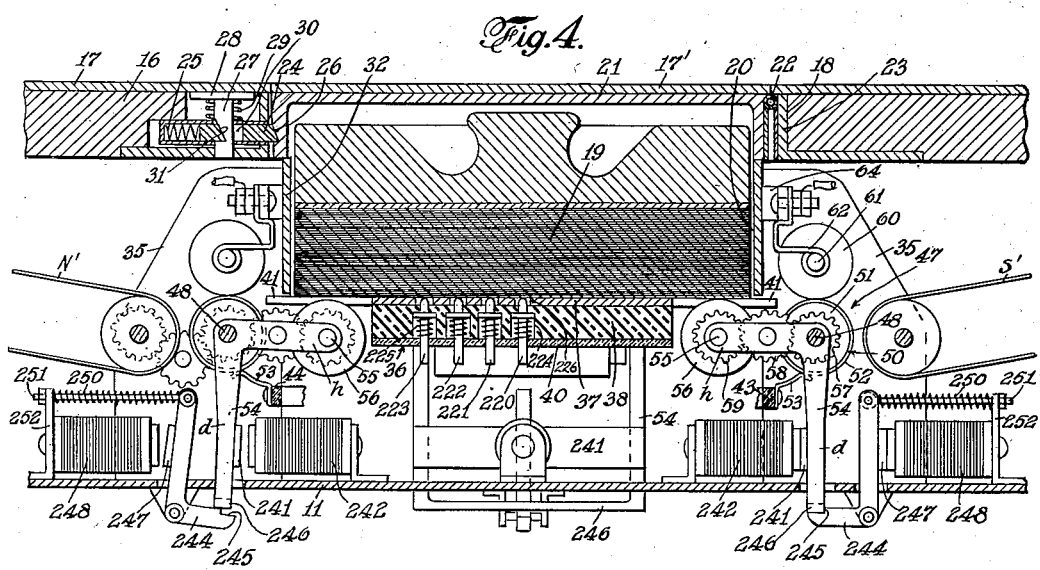
Figure 9:
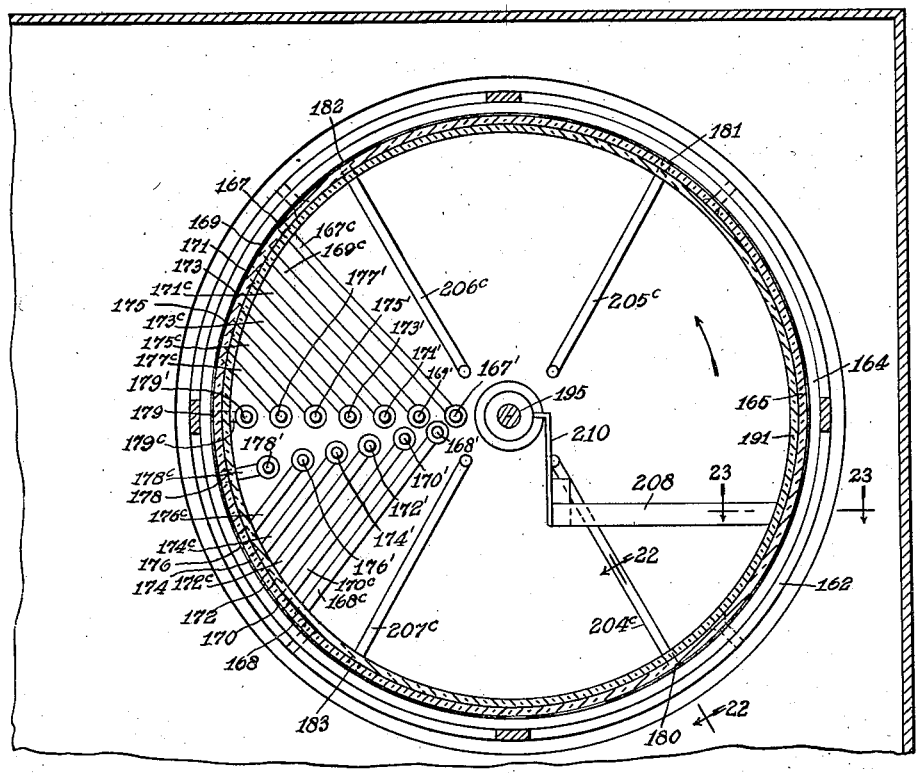
Figure 10:
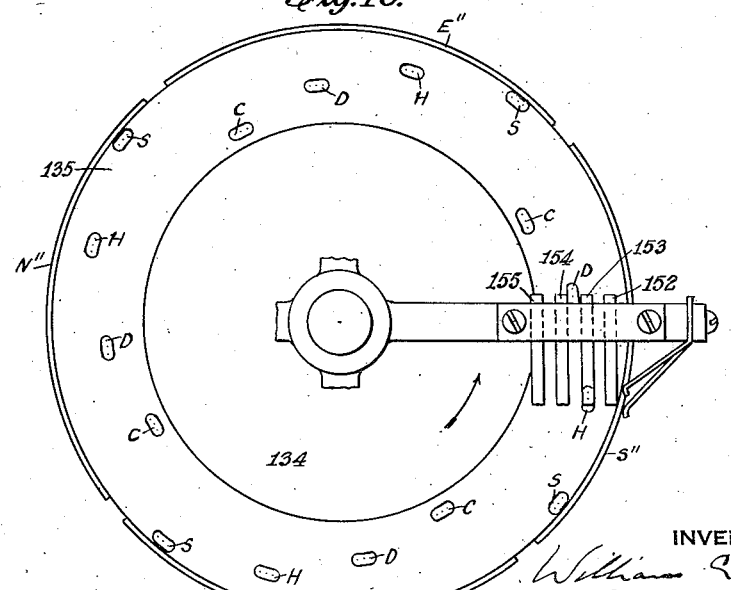
Figure 20:
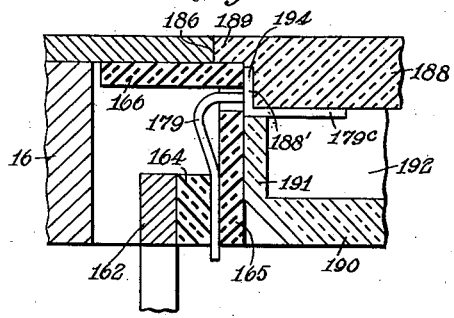
Figure 21:
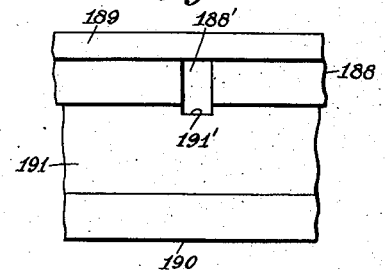
Figure 22:
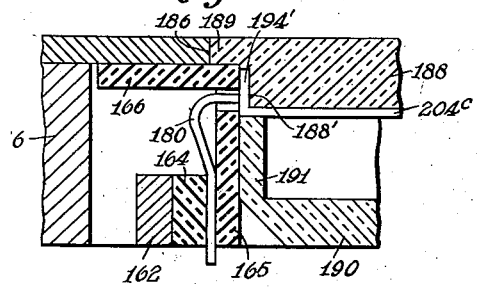
Figure 23:
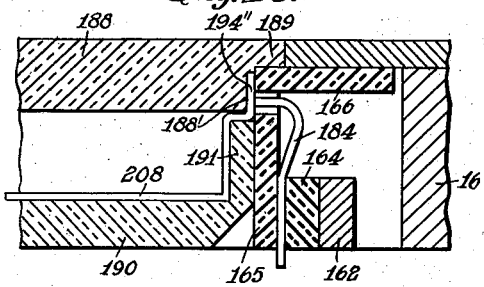

Fig. 1 is a plan view of a card table especially constructed and admirably adapted for use in the one embodiment of the invention herein illustrated; Fig. 2 is a side elevation of the table; Fig. 3 is a somewhat enlarged plan view of the deck holder and its associated card ejecting means; Fig. 4 is a vertical, central, longitudinal sectional view of the deck holder showing its relation to the table top and to certain elements of the card ejecting means; Fig. 5 is an enlarged plan view of the lower right-hand corner of the table with the top broken away and with the selector switch unit removed with the view to illustrating a selector adapted for use in dealing a predetermined hand to each of four players; Fig. 6 is a view in elevation of the mechanism appearing in Fig. 5 and showing the selector switch unit in operative position with respect to the selector; Fig. 7 is a vertical, central, sectional view of the mechanism appearing in Fig. 6; Fig. 8 is a view similar to that of Fig. 6 and showing the mechanism thereof as viewed from the right; Fig. 9 is a horizontal, sectional view taken on line 9—9 of Fig. 7; Fig. 10 is a bottom view of the rotatable selector-carrying support appearing in Figs. 6 to 8 inclusive; Fig. 11 is a plan view of one of the card-receiving pockets or stations and the delivery end of its associated conveyor; Fig. 12 is a view in elevation of the card-receiving pocket or station of Fig. 1 and the portion of its associated conveyor appearing therein; Figs. 13 to 16 inclusive are face views of different playing cards, each constituting a part of a deck of cards adapted for use in the apparatus embodying the present invention, in which deck all of the cards possess different physical characteristics according to their respective suit and denominational value; Fig. 17 is a plan view of a chart, herein shown for the purpose of facilitating an explanation of the hand-values represented by the selector appearing in Fig. 5; Fig. 18 is a wiring diagram illustrating the various control circuits employed in the herein illustrated embodiment of the invention; Fig. 19 shows a slightly modified portion of the wiring diagram of Fig. 18; Fig. 20 is an enlarged fragmental, sectional view, showing one of the spring-finger contacts in relation to its associated conductor strip, the section being identical with that of Fig. 7; Fig. 21 is an enlarged fragmental view of a peripheral portion of the closure of Fig. 7, and showing a conductor-strip-receiving notch and recess; Fig. 22 is an enlarged fragmental sectional view taken on line 22—22 of Fig. 9; Fig. 23 is an enlarged fragmental sectional view taken on line 23—23 of Fig. 9; and Fig. 24 is a fragmental plan view showing the relative positions of the fixed contacts over which moves the frictionally driven contact arm of Figs. 6 to 8.

Although the various elements, combinations of elements and sub-combinations of elements entering into and forming a part of the present invention may be enclosed by or carried within various types of enclosures or housings, the particular means for performing that function is herein illustrated as a table closely approaching in general appearance an ordinary bridge table and adapted to be employed as such. The table 10 includes a metal bottom 11, which is adapted to support either directly or indirectly all of the essential mechanism of the apparatus and to which are connected a plurality of foldable or collapsible legs 12. Secured to and projecting upwardly from the outer margins of the table bottom are a plurality of side walls 14 which, at their upper margins, are flared outwardly so as to add to the finished appearance of the table and at the same time provide a ledge 15 adapted to receive and support a table top 16 which is provided on its upper or playing surface with a felt or other yieldable facing 17.

As shown most clearly in Figs. 1 and 4, the table top 16 is provided with a central opening 18 through which a deck of playing cards 19 may be introduced into a deck holder 20 from which the individual cards, hereinafter more particularly described with respect to their physical characteristics, are to be delivered to various stations. With the opening 18 is associated a cover 21 which, like the table top 16, is provided on its upper surface with a felt or other facing 17'. The closure 21 is connected by a spring hinge 22 to the vertical flange of an angle frame 23, which flange is confined within the opening 18, whereas its associated horizontal flange is let into and suitably secured to the lower face of the table top adjacent the opening thereof. In order that the closure 21 may be locked in its closed position, the angle frame is provided with a latch 24, which is normally urged to the right, as viewed in Fig. 4, under the influence of its associated compression spring 25, the outer end of the latch being adapted to enter a notch 26 provided in the adjacent depending flange of the closure as such closure is moved from an open position to its closed position. The latch 24 may be retracted against the influence of its associated spring 25 by a release plunger 27 which is provided with an actuating button 28 and is normally held in an elevated position, as shown in Fig. 4, by its associated compression spring 29. The plunger 27 projects through a slot 30, formed in the latch 24, and is provided with a cam surface adapted to cooperate with a similar surface provided on the latch at one end of its slot, said cam surfaces being shown in their normal relations to each other and indicated jointly by the numeral 31. Although the button-actuated plunger 27 is not visible from above the table top, due to the presence of the overlying felt or other yieldable facing 17, it may be readily depressed, to the slight extent necessary to effect the release of the latch 24 and thereby permit the closure to open under the influence of its associated spring hinge 22, by applying a slight pressure to the facing at a point directly over the actuating button 28.

The deck holder 20 includes a plurality of side walls 32, which are secured together at their vertical meeting edges and are supported by a plurality of brackets 34, mounted for vertical adjustment on a plurality of vertically disposed angle-like supports 35, which are suitably connected to the table bottom 11 and the wing portions of which serve as bearings for a plurality of shafts and driving connections, hereinafter more particularly described.

The bottom 36 of the deck holder 20 is spaced at all points from the lower edges of the respective side walls 32 a distance equal to the thickness of the respective cards of the deck, such distance being determined to a nicety, at the time the apparatus is initially assembled, by vertically adjusting the side walls of the deck holder to a proper position before securing them in a permanently spaced relation to the bottom of the deck receiver by the vertically adjustable brackets 34 hereinbefore described. The bottom 36 of the deck holder includes a metal plate 37, on which the deck of cards 19 is directly supported and to which is secured a relatively thick slab 38 of insulating material, such as Bakelite, having formed therein a plurality of contact receiving pockets, hereinafter more particularly described, over which is secured a facing 40 of insulating material, preferably Bakelite. The bottom 36 is held in a definite position by reason of the fact that the corners of the slab 38 are confined within a plurality of notches 41 formed in the vertical supports 35 at the corners thereof. As shown most clearly in Figs. 3 and 4, the metal plate 37 is cut away to provide a plurality of notches 42 through which the respective cards, as they successively assume card ejecting positions in the deck holder, may be acted on by card ejecting means, hereinafter more particularly described, to effect an initial movement of the cards toward the various stations to which they are to be delivered.

The above-mentioned card ejecting means includes a plurality of ejector units 47, each of which includes a shaft 48, journalled at its opposite ends in adjacent supports 35 and provided with an ejector roller 50, which includes a core 51 of insulating material, carrying thereon a metal sleeve 52, which is maintained in wiping engagement with a brush contact 53, secured to a supporting frame 43, of insulating material, which is supported in a definite position by reason of the fact that its corners are confined within notches 44 formed in the corners of the supports 35. On the shaft 48 is pivotally supported a pair of bell-crank levers 54, each having a horizontal arm h and a depending arm d, as shown in Fig. 4. Within the outer ends of the bell-crank arms h, is journalled a shaft 55, to which is connected a friction roller 56, adapted to be moved into card-engaging position by way of one of the openings 42 formed in the plate 37. This roller is connected to the ejector roller 50 by a train of gears, 57, 58 and 59, the first of which is secured to the shaft 48, the second of which is supported by one of the bell-crank arms h, and the third of which is secured to the shaft 55. Disposed above and normally contacting with the ejector roller 50, is a metal pressure roller 60, which is carried by a metal shaft 61, journalled at its opposite ends in a pair of spring bearings 62, which are secured to and insulated from the wall 23 of the deck holder 20 through the medium of a block 64 of suitable insulating material.

In order that the ejector rollers 50 may be rotated in unison, their shafts 48 are connected together by a plurality of pairs of bevel gears 65, as shown in Fig. 3. The direction of rotation of any one of the ejector rollers 50 is such that any card presented to it and its contacting pressure roller 60, under the influence of their associated friction roller 56, will be gripped between the ejector roller and the pressure roller and moved further toward the station to which that card is to be delivered, it being noted that the friction rollers 56, due to the presence of their respectively associated intermediate gears 58, will rotate in the direction of their corresponding ejector rollers.

In the herein illustrated embodiment of the invention, the stations N, E, S, W, to which the cards are to be delivered are located within the table 10 at the respective margins thereof, access to the stations being had through suitable openings 66 formed in the side walls 14 of the table. Each of the stations N, E, S, W, includes an inclined card-receiving plate 67, having at its opposite margins a pair of upwardly extending flanges 68 and provided at its lower end with an outwardly movable door or card-stop 70, pivotally connected to the plate 67 by a spring hinge 71, which normally retains the stop in a vertical position. The card-receiving plate 67 is secured to outwardly extending flanges 72 provided at the upper margins of a pair of vertical supports 74, the lower outwardly extending flanges 75 of which are provided with elongated openings 76, through which bolts 77 may be passed for securing the vertical supports to the bottom 11 of the table, the elongated slots permitting lateral adjustment of the supports toward or away from the center of the table so that the belts of the card delivering conveyors, hereinafter more particularly described, may be tightened as required. In order that the doors 70 may be maintained properly positioned or normally flush with the side walls 14 of the table, as shown in Fig. 12, despite any lateral adjustment that may be made of the supports 74, the plate 67 is adjustably secured to the outwardly projecting flanges 72 of the supports by a plurality of bolts 78 which pass through elongated openings 79 formed in the flanges on which the plates rest.

The delivery means for carrying the cards, when released from between the ejector rollers 50 and the pressure rollers 60, to the various stations N, E, S, W, is herein shown as comprising a plurality of endless conveyors N', E', S', W', one of which, herein shown as the conveyor W', may be utilized as a medium by which power of rotation may be delivered from a suitable power source, such as an electric motor M, to the several ejector rollers 50, and in turn to the remaining conveyors N', E', S'. Each of the conveyors includes a pair of pulleys 80 and 81, carried by shafts 82 and 83, the former of which is journalled in adjacent pairs of supports 35 and the latter of which is disposed adjacent its corresponding station and journalled in the upper margin of the supports 74 on which the inclined plate 67 of that station is supported. Passing about each pair of pulleys 80—81, is an endless conveyor belt 84 on which the cards delivered from its associated ejector roller 50 and pressure roller 60 are deposited and by which they are thereafter carried to the respective stations where they are permitted to fall by gravity from the delivery end of the conveyor onto its associated inclined plate 67. As to the conveyor W', it will be noted from Fig. 3 that its associated shaft 82 is connected to the shaft 48 of its associated ejector roller 50 through a pair of trains of gears 85—85, 86—86, 87—87, the first pair of which gears 85—85 are connected to opposite ends of the shaft 82, the second pair of which gears 86—86 are carried by adjacent supports 35, and the third pair of which gears 87—87 are connected to the opposite ends of the shaft 48. By reason of the presence of the intermediate gears 86, it will be understood that the direction of rotation of the ejector roller 50 associated with the conveyor W' will correspond to the direction of linear travel of the upper reach of the conveyor belt 84 of that conveyor, which direction of travel is indicated by the arrow appearing in Figs. 1 and 3. As to the conveyors N', E', S', their conveyor belts 84 are driven in a direction corresponding to the direction of travel of the conveyor belt of the conveyor W' by reason of the fact that their associated pulleys 80 are connected to the respective ejector rollers 50 through trains of gears 85', 86', and 87,' which correspond to and are mounted in a manner similar to the trains of gears 85—85, 86—86 and 87—87, hereinbefore described The power transmitting means by which the motor M is connected to the conveyor W' includes a horizontal shaft 88 provided at one end with a spur gear 90 meshing with a similar gear 91 which is secured to the shaft of the motor. The shaft 88 is journalled in a pair of bearings 92 which are carried by a base plate 94 on which the motor M is mounted. Intermediate the bearings 92, the shaft 88 is provided with a spiral gear 95 which meshes with a similar gear 96 secured to a horizontal shaft 97, which is journalled in a pair of bearings 98 carried by the base plate 94, the shaft 97 being provided at its outer end with a spur gear 100 meshing with a similar gear 101 secured to one end of the shaft 83 on which the pulley 81 of the conveyor W' is carried.

Projecting upwardly from the base 94 is a boss 102 having fixed therein a stub shaft 104 about which a turntable driving shaft 105 is adapted to rotate, the shaft 105 being journalled in the hub-like bearing 106 of a spider 107, supported in a fixed position by a pair of brackets 108 which depend from diametrically opposed arms 110 of the spider and are secured to the base plate 94. To the shaft 105 are connected a worm gear 111 and a worm 112, the former of which meshes with a worm 99 carried by the shaft 88, and the latter of which meshes with a worm gear 114 carried by a shaft 115 journalled in a pair of bearings 116 and 117 carried by the base plate 94. The shaft 115 is adapted to operate an automatically actuated switch mechanism 118, the function of which will hereinafter more clearly appear. This switch mechanism includes a switch control-disc 120, which is secured to the outer end of the shaft 115 and is provided in its periphery with a notch 121. Extending from the bearing 117, is a switch support 122 on which is mounted an ordinary toggle switch 124, having an actuating lever 125 housed within the table 10 and provided with an operating key or button 126, projecting through a side wall 14 of the table where it may be readily moved to closed-circuit position, it being understood that as the switch is closed by the key or button 126 the actuating lever 125 will be moved in a counter-clockwise direction as viewed in Fig. 6. Pivotally connected to the switch support 122 is a switch actuating bell-crank lever 127, one end of which is provided with a yoke 128, embracing the outer end of the actuating lever 125 and the other end of which is provided with a roller 130, adapted to enter the notch 121 of the disc 120 under the influence of a switch-actuating spring 131, secured to the support 122 and adapted to exert a switch-opening influence on the bell-crank lever 127. The switch 124 is adapted, when actuated by the key or button 126, to close the power circuit, hereinafter more particularly described, of the motor M, the closing operation of the switch being such that the roller 130 is moved outwardly from the notch 121 of the disc 120. Upon closing the motor circuit the disc 120 begins to rotate, whereupon the peripheral surface of the disc 120 moves under the roller 130 and serves to retain the bell-crank lever 127 in closed-circuit position against the influence of the spring 131 until such time as the disc has completed one revolution, whereupon the notch 121 is presented to the roller 130, allowing the spring 131 to move the bell-crank lever 127 in a counter-clockwise direction, thereby forcing the actuating lever 125 in a clockwise direction to bring about an open-circuit condition of the switch 124 and stop the motor M, the gear ratio between the gears 112 and 114 being such that the disc makes one complete revolution for every fourteen revolutions of the shaft 105.

To the upper end of the shaft 105, which is provided with a longitudinal opening or chamber 132, there is connected a turntable 134, of suitable insulating material such as Bakelite, to the lower peripheral margin of which is connected a commutator ring 135, provided, as shown most clearly in Fig. 10, with four groups of suit contacts, which, in their respective groups, are offset at varying distances from the center of rotation of the turntable and are indicated by the reference characters S, H, D, C. As to these contacts, it will be noted that all of the S contacts, all of the H contacts, all of the D contacts and all of the C contacts, are in circular alignment, reference being had to the center of rotation of the turntable 134, the S contacts being at a greater distance from the center of rotation than the H contacts, the H contacts being at a greater distance from the center of rotation than the D contacts, and the D contacts being at a greater distance from the center of rotation than the C contacts. To the upper face of the turntable 134, is connected a metal plate 136 having a depending commutator flange 137 which embraces the upper peripheral surface of the turntable and is provided with a plurality of contact segments N″, E″, S″, W″ disposed out of alignment with each other and spaced circumferentially from each other.

Within the chamber 132 of the shaft 105, is disposed a vertically movable shaft 138, of insulating material such as Bakelite; which is square throughout the greater portion of its length and presents at its lower end a cylindrical surface 139 slidably engaging the wall of the chamber. The square portion of the shaft 138 projects through and is slidable within a square opening 140, formed in the metal plate 136 centrally thereof and serving to insure the shaft 138 against rotation with respect to the shaft 105 without interfering with relative vertical movement therebetween. The shaft 138 is provided with a central longitudinal opening 141, within which is confined a compression spring 142, by which the shaft 138 may be moved upwardly with respect to the shaft 105. The shaft 138 presents at its upper end a neck 143 adjacent to which is formed a shoulder 144, onto which neck and into engagement with which shoulder is forced the hub portion 145 of a relatively thin metal disc 146, which is adapted to rotate with the turntable 134 under certain conditions and to be elevated by the spring 142 under other conditions to a position flush with or slightly above the surface of the table top 16. The upper end of the shaft 138 is provided with a central longitudinal socket 147, the purpose of which will hereinafter more clearly appear.

Supported by one of the arms 110 of the spider 107, are a plurality of spring-finger contacts 152, 153, 154 and 155 which are adapted to engage the suit contacts S, H, D, C, respectively, carried by the commutator ring 135, the contacts 152 to 155 being held in position on the spider 107 and insulated therefrom by a pair of strips 156 of insulating material between which are impinged the terminal portions of the finger contacts. Carried by the same arm that supports the contacts 152 to 155 inclusive, are a plurality of similar contacts 157 to 161 inclusive, the first four of which are adapted to engage the contact segments N″, E″, S″ and W″ in order, and the last of which is maintained in constant engagement with the periphery of the commutator ring 135, the contacts 157 to 161, like the contacts 152 to 155, being held in position on the spider 107 and insulated therefrom by a pair of strips 156′ of insulating material between which are impinged the terminal portions of the finger contacts 157 to 161. As shown most clearly in Figs. 6 and 8, the upper end of the arms 110 of the spider 107 are connected together by webs forming a rim 162, to which are connected a pair of rings 164 and 165, of insulating material such as Bakelite, the latter of which is provided at its upper margin with an outwardly projecting flange 166. Between the rings 164 and 165 are clamped the terminal portions of a plurality of spring-finger contacts 167 to 184 inclusive, the upper or hook-like end of which projects through openings 185 formed in the vertical portion of the ring 165, which is disposed directly beneath an opening 186 formed in the table top 16 and having a diameter somewhat greater than the inside diameter of the ring 165.

For the opening 186, there is provided a removable closure 187, the upper portion or plate 188 of which is provided with a plurality of peripheral recesses 188′ and is formed with a peripheral flange 189, adapted to rest on the upper surface of the flange 166 of the ring 165. The closure 187 serves not only as a cover for the opening 186 but also as a plunger-contact-carrier unit, and includes a disc 190 of insulating material which is secured to the plate 188 and is provided at its peripheral margin with an upwardly extending flange 191 which is provided with a plurality of notches 191′ and engages the peripheral margin of the plate 188, the disc 190 forming with the plate 188 a lateral chamber 192, within which are disposed a plurality of vertically disposed spring pressed plunger-contacts 167′ to 179′, the lower ends of which are confined for vertical movement within a plurality of openings formed in the disc 190, as shown in Fig. 7, and the upper ends of which carry their respectively associated compression springs 193. The upper ends of the springs 193 engage the inner ends of a plurality of conductor strips 167c to 179c, which are suitably connected to the lower face of the plate 188. The outer ends of the conductor strips 167c to 179c pass through certain of the notches 191', already mentioned, and are turned up so as to present contact areas 194 which are adapted to engage the respective spring finger contacts 167 to 179 inclusive and are confined within certain of the recesses 188' formed in the periphery of the plate 188.

Centrally journalled in the plate 188, is a vertical shaft 195, which is provided at its lower end with a circular contact flange 196 and which at its upper end is provided with a knob 197, with which is associated an indicator-contact arm 198, the knob 197 serving to facilitate removal and replacement of the closure 187 as well as to enable the contact arm 198 to be so positioned as to select the station with respect to which the successive deals are to begin when the apparatus is employed as a dealing device without regard to allotment of definite cards to pre-selected stations. The lower end of the shaft 195 is reduced so as to provide a depending shank 200, which is split and adapted to be introduced into the socket 147 of the shaft 138 to establish therewith a friction driving connection when the closure 187 is placed in an operative position within the opening 186 of the table top 16, it being noted that the closure 187 can assume only one position within such opening due to the presence of an index pin 202, Fig. 5, carried by the ring 165 and adapted to enter an index notch formed in the peripheral edge or margin of the plate 188. The contact arm 198, which is carried by the shaft 195, is adapted to successively engage a plurality of contacts 204, 205, 206 and 207, which are exposed at the top of the plate 188 directly beneath the sweep of the outer end of the arm 198 and project downwardly through the plate into the chamber 192 where they are connected to a plurality of conductor strips 204c to 207c, the outer ends of which pass through certain of the notches 191', hereinbefore mentioned, and are turned up so as to present contact areas 194' which are adapted to engage the spring-finger contacts 180 to 183 and are confined within certain of the recesses 188' formed in the periphery of the plate 188. Within the chamber 192 is fixed a lead-in conductor strip 208, one end of which is provided with a brush contact 210, adapted to maintain engagement with the contact flange 196 of the shaft 195, and the other end of which is bent up and projects through one of the notches 191', already described, where it is again bent up so as to present a contact area 194" which is adapted to engage the spring-finger contact 184 and which is confined within one of the recesses 188' formed in the periphery of the plate 188.

By reason of the presence of the spring 142 in association with the shaft 138, it will be understood that when the closure 187 is removed the shaft 138 will be elevated, carrying with it its associated disc 146 to a position flush with or slightly above the surface of the table top 16 so as to permit a selector 211, representative of predetermined hands for the respective stations, to be placed in an operative position on that disc, which selector may be equally as readily removed when the disc 146 is again presented after the dealing operation. The selector herein shown, and of which there may be as many different patterns as there are possible different groups of hands in a deck of cards, is representative, under certain conditions hereinafter more particularly described, of the following hands to be dealt to the respective players, designated for convenience as North, East, South, West.

|          | North         | East          | South      | West          |
|----------|---------------|---------------|------------|---------------|
| Spades   | J, 4, 2       | 9, 7, 6       | A, K       | Q, 10, 8, 5, 3 |
| Hearts   | 7, 6          | A, Q, 9, 5, 3 | K, J, 8, 2 | 10, 4         |
| Diamonds | 9, 7, 4       | A, 8, 6, 5    | Q, J, 10   | K, 3, 2       |
| Clubs    | J, 10, 8, 4, 2 | 6            | K, Q, 7, 5 | A, 9, 3       |

The selector 211 is in the form of a thin disc of suitable insulating material, such as relatively stiff cardboard of fine texture, fibre, Bakelite, and celluloid of a non-inflammable character. The selector disc is provided with a plurality of definitely positioned perforations 211', there being fifty-two such perforations, of which thirteen are formed in each quadrant of the disc representing the thirteen cards that are to be dealt to the respective players. It is through these perforations that the spring-pressed plunger contacts 167' to 179' are adapted to be moved into engagement with the metal disc 146 as that disc is rotated—it being noted that a positive driving connection is afforded between the selector 211 and the disc 146 by an upwardly projecting lug 212 which is carried by the disc and adapted to be received by either the notch 213 or the notch 214 provided in the peripheral margin of the selector disc. When the selector disc is so positioned that the lug 212 is confined within the notch 213, the cards will be delivered to the players according to the above schedule, but when the selector is so positioned that the lug 212 is confined within the notch 214 the hands set forth in that schedule as assigned to North, East, South, and West will be delivered to East, South, West, and North, respectively. Allotment of the first-named order is effected because when the selector is placed in the first of the above-mentioned positions, the perforations 211' of the North, East, South, and West quadrants of the selector are rendered effective with respect to the plunger contacts 167' to 179' during such time as the contact segments N", E", S", and W" engage the spring-finger contacts 157, 158, 159 and 160 respectively; and allotment of the second-named order is effected because when the selector 211 is shifted to its second position above mentioned, the perforations 211' of the North, East, South and West quadrants of the selector are rendered effective with respect to the plunger contacts 167' to 179' during such time as the contact segments E", S", W" and N" engage the spring-finger contacts 158, 159, 160 and 157 respectively.

For a further understanding of the relative positions of the perforations 211' of the selector herein shown, and of the hand values represented by that selector, reference may be had to the chart of Fig. 17 wherein the small circles of the North, East, South, and West quadrants correspond in position to the perforations 211' of the selector 211. From this chart it will be observed that the denominational position of the perforations are represented by thirteen concentric circles, which are herein illustrated, as ranging in value from the deuce to the ace when considered radially from the common center of the circles. Moreover, it will be noted that the suits are distributed in a counter-clockwise direction over the respective quadrants in the order of clubs, diamonds, hearts, spades, and that the possible positions for the perforations peculiar to each suit may be on two radii, all of such radii being equally angularly spaced within the respective quadrant a distance corresponding to the angle between the radii on which the plunger contacts 167' to 179' are disposed in the closure 187. By reason of the fact that the radii, common to the respective suits of the respective quadrants, are angularly spaced in accordance with the angular relation between the radii on which the plunger contacts 167' to 179' are disposed, the diameter of the selector 211, the turntable 134 and the closure 187 may be kept at a minimum, thus conserving space that these parts of the apparatus would otherwise consume.

Figure 14:
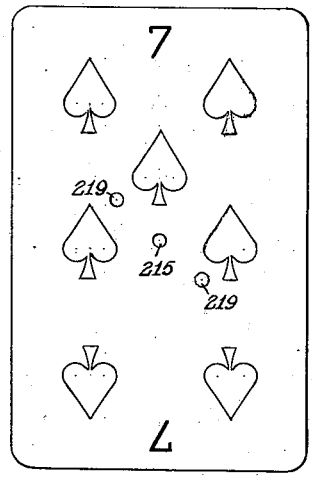
Figure 15:
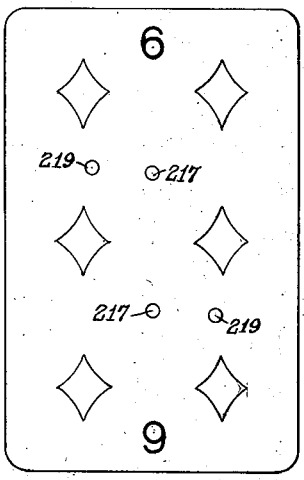
Figure 16:
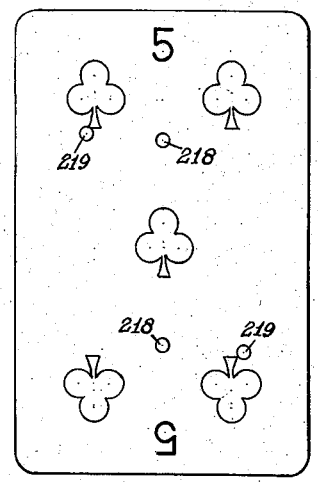
Figure 17:
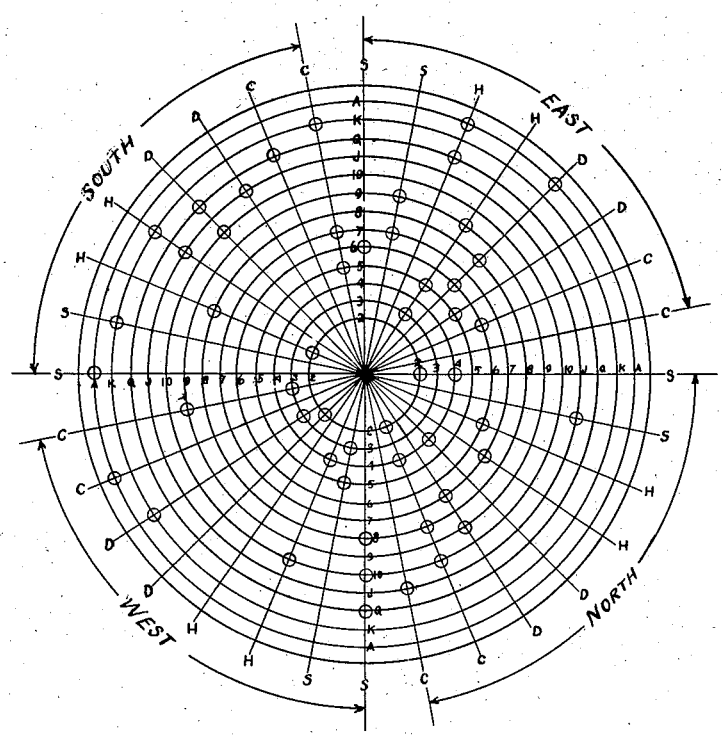

Referring to the cards of the deck 19, it is to be noted that they are individually characterized because of their respective physical characteristics, as will be readily understood from the disclosure of Figs. 13 to 16 inclusive, wherein cards of different suits and of different denominational values are shown, to wit, 8 of hearts, 7 of spades, 6 of diamonds, 5 of clubs. Each card of the spade suit is provided, as shown in Fig. 14, on its face with a suit-contact area 215, which may be in the form of a small disc of metal foil adhesively or otherwise attached to the face of the card centrally thereof or in the form of a metallic substance electrolytically or otherwise suitably deposited on and fixed to the face of the card. Each card of the heart suit, the diamond suit and the club suit is also provided similarly with a pair of suit-contact areas 216, 217 and 218, as shown in Figs. 13, 15 and 16, respectively, it being noted in Fig. 13 that the spade, diamond and club contact areas are indicated in dotted lines, in order to illustrate the different positions that these contact areas occupy in a vertical central plane passing longitudinally through a deck of superimposed cards, registering with each other as when they are held in the deck holder 20. Each card of each suit carries a pair of complementally positioned denomination-contact areas 219, those shown in full lines in Figs. 13, 14, 15, and 16 being peculiar to cards having the value of eight, seven, six, and five, and those indicated in dotted lines in Fig. 13 being peculiar to card-values ranging from the two-spot to the nine-spot, both inclusive, and from the seven-spot to the ace, both inclusive, when considered in the order of the direction indicated by the arrows A adjacent the respective imaginary vertical planes intersecting the respective groups of denomination-contact areas when passing vertically through a deck of superimposed cards registering with each other as when they are held in the deck holder 20.

From the foregoing, it will be understood that no two of the fifty-two cards of the deck 19 have the same physical characteristics, inasmuch as the relation of suit-contact areas to denomination-contact areas on no two cards is the same, the factor of dissimilarity being taken advantage of, as will hereinafter more clearly appear, in effecting the allotment of predetermined hand values to predetermined stations or players.

The cards when placed in the deck holder 20 are positioned with their faces down so that their suit contact areas 215 to 218 inclusive may cooperate with a plurality of suit-contact-area-engaging plunger contacts 220 to 223 inclusive. These plungers are carried within contact-receiving pockets 224, provided in the slab 38 of insulating material which is included as an element of the bottom 36 of the deck holder 20. The plunger contacts 220—223 are urged upwardly by their associated compression springs 225 which are held against displacement by the facing 40 of insulating material through which the lower ends of the contacts project, the upper ends of the contacts projecting through openings formed in the slab 38 and terminate in such a relation to the upper face of the metal plate 37 that they are adapted to engage the suit-contact areas 215 to 218, inclusive, which are of such dimensions that they engage the upper face of the metal plate 37 adjacent the relatively large openings 226 therein, through which the upper ends of the contacts 220 to 223 project without engaging the face plate 37.

Also associated with the bottom 36 of the deck holder 20, are a plurality of denomination-contact-area-engaging plunger contacts 227 to 239, inclusive, which are grouped as shown in Fig. 3 and which are not only identical to the plunger contacts 220 to 223 but are also mounted in and supported by the bottom 36 in the manner described in connection with the plunger contacts 220 to 223. The denomination-contact-area-engaging plunger contacts 227 to 239 terminate in such a relation to the upper face of the metal plate 37 that they are adapted to engage the denomination-contact areas 219, which are of such dimensions that they engage the upper face of the metal plate 37 adjacent the relatively large openings 240 therein, through which the upper ends of the plunger contacts 227 to 239 inclusive project without engaging the plate 37.

As shown most clearly in Fig. 4, the depending arms of each pair of bell-crank levers 54 support an armature 241, in an operative relation to which an electromagnet 242 is supported on the table bottom 11, the magnet being adapted when energized to move the bell-crank levers in a proper direction and a sufficient distance to cause the friction roller 56 associated therewith to engage the lowermost card of the deck 19 preparatory to the removal of that card from the deck holder 20. Inasmuch as the energizing circuit for the magnet 242 is opened, as will hereinafter more clearly appear, before the card undergoing ejection is gripped between the ejector roller 59 and the pressure roller 60, it becomes necessary to lock the friction roller 56 in engagement with the card to be ejected until at least such time as that card has been gripped between the ejector roller 59 and the pressure roller 60, and to this end an electromagnetically actuated latch is provided. This latch is in the form of a bell-crank lever 244 which is pivotally connected to the table bottom 11 and the horizontal arm of which is provided with a notch 245, adapted to cooperate with a latch bar 246, connected to the lower ends of the vertical arms of the bell-crank levers 54. The vertical arm of the bell-crank lever 244 carries an armature 247 in operative relation to which an electromagnet 248 is supported by a table bottom 11. The magnet 248 is normally energized, but its associated bell-crank lever 244 is restrained against movement from its position shown at the left in Fig. 4 to its latching position shown at the right in Fig. 4 until the magnet 242 has been energized. As soon as the magnet 242 is energized, its associated bell-crank levers 54 so move as to permit their cooperating bell-crank lever 244 to move into latching position with respect to the latch bar 246, it being understood that the electromagnet 248 is capable of exerting a force on its associated bell-crank lever which is sufficient to overcome the opposing force of its associated compression spring 250. This compression spring is adapted to move the bell-crank lever 244 from its latching position, shown at the right in Fig. 4, to its unlatched position, shown at the left in Fig. 4, as soon as its associated electromagnet 248 is deenergized by reason of its circuit being open through any pair of rollers 50—60, as will hereinafter more clearly appear, the compression spring 250 being carried by a guide rod 251, one end of which is pivotally connected to the vertical arm of the bell-crank lever 244 and the other end of which is slidably mounted in a guide 252 secured to the table bottom 11.

Referring to the wiring diagram of Fig. 18, it will be noted that in the circuit 254 of the motor M, which is adapted to be connected into an ordinary house-lighting circuit, there is disposed the motor control switch 124 and the winding 255 of a solenoid 256, which is supported on the base plate 94 on which the motor is mounted and which when energized is adapted to release a brake mechanism 257 associated with the armature shaft of the motor. The brake mechanism 257, together with its associated solenoid 256, is shown only conventionally inasmuch as brakes of this type, which are released under the influence of an energized solenoid and are applied under the influence of spring pressure, are well known in the art. In order to obtain a lower potential than that of ordinary house-lighting currents for the various control circuits of the apparatus, there is provided a transformer T which is supported on the base plate 94 and the primary P of which is connected in parallel with the motor M and the secondary S of which is connected to a return conductor 258 and to a lead conductor 260. The conductor 260 is connected to the common terminal of a double throw switch 261 suitably supported by the table 10 as at one side thereof, reference being had particularly to Figs. 1 and 2. The switch 261 is adapted to connect the lead 260 to either of the conductors 262 or 263, whereby the apparatus may be conditioned in the first instance for dealing predetermined hands and in the second instance for dealing without regard to such hands. The conductor 262 is connected to the terminal end of the contact 161, reference being had to Fig. 7, which contact is maintained in wiping engagement with the peripheral edge of the commutator ring 135 and the conductor 263 is connected to the terminal end of the contact 184, which engages the outer end of the conductor strip 208, reference being had to Figs. 9 and 23, which is electrically connected by reason of its associated brush 210 to the shaft 195 carrying the contact arm 198. Leading from the suit contacts 152 to 155, are a plurality of conductors 264 to 267, which are connected to the lower ends of the suit-contact-area-engaging plunger contacts 220 to 223 inclusive. Leading from the denomination-contact-area-engaging plunger contacts 227 to 239 inclusive are a plurality of conductors 268 to 280 respectively, which conductors are connected to the respective plunger contacts 167' to 179' through their associated compression springs 193 and their conductor strips 167c to 179c by way of their respectively associated spring contacts 167 to 179 inclusive to the terminal ends of which the conductors 268 to 280 are attached. Leading from the contacts 157 to 160, are a plurality of conductors 281 to 284, in which are disposed the windings of the magnets 242, which are respectively associated with the ejector units 47 common to the conveyors N', E', S' and W' and hereinafter respectively referred to as the "North", "East", "South" and "West" ejector units. The conductors 281 to 284 are connected to a common conductor 285, which is connected to the brush contact 53 engaging the ejector roller 50 of the "West" ejector unit 47. The pressure rollers 60 of the "West" and "South" ejector units 47 are electrically connected to each other by a conductor 286, inasmuch as that conductor is connected to the spring bearings 62 in which the shafts 61 of the pressure rollers are journalled. The ejector rollers 50 of the "South" and "East" ejector units 47 are electrically connected together by reason of the fact that their associated brush contacts 53 are connected by a conductor 287. The pressure rollers 60 of the "East" and "North" ejector units 47 are electrically connected together by a conductor 288 inasmuch as that conductor is connected to the spring bearings 62 in which the shafts 61 of the pressure rollers are journalled, and the pressure roller 50 of the "North" ejector unit 47 is electrically connected to the secondary winding S of the transformer T by way of the return conductor 258 inasmuch as that conductor is connected to the brush contact 53 associated with that roller. Leading from the conductor 260 is a branch conductor 289 which is connected to the windings of the several magnets 248 by way of conductors 290, the windings of the magnets being in turn connected to the conductor 285 by way of conductors 291.

Leading from the contacts 180 to 183, reference being had to Figs. 9 and 22, are a plurality of conductors 292 to 295, which, as shown in Fig. 18, are connected respectively to the conductors 281 to 284 and which are adapted, when the switch 261 bridges the gap between the conductors 260 and 263, to connect the conductor 260 with the conductors 281 to 284 by way of the conductor 163, contact 184 (Fig. 23) conductor strip 208, brush contact 210, contact flange 196, shaft 195, contact arm 198, the several contacts 204 to 207, their respectively associated conductor strips 204' to 207' and their associated contacts 180 to 183.

Instead of employing the transformer T as an instrumentality for obtaining a current of relatively low potential in the various control circuits of which the conductors 258, 260, 262, 263 and 289 constitute parts, a voltage reducer of the type shown in Fig. 19 may be used. The voltage reducer comprises a suitable resistance 296, indicated as variable, and is adapted, when connected as shown in the circuits of which the conductors 258, 260, 262, 263 and 289 constitute parts, to provide a suitable low potential current for such circuits regardless of whether the motor M is connected to an A. C. or a D. C. source. Inasmuch as a further completion of the various control circuits in Fig. 19 would constitute a mere duplication of the greater portion of what is shown in Fig. 18, it is deemed unnecessary to elaborate further on the matter of substituting the variable resistance 296 for the transformer T.

In considering the operation of the apparatus, it will be assumed that the switch 261 is positioned as shown in Fig. 18, that the lowermost card in the deck 19 is the eight of hearts, and that the selector 211 has just been moved by the turntable 134 into a position where the spring pressed plunger contacts 167' to 179' coincide with the radial rows of perforations 211' which are indicative of the cards of the heart suit that are to be dealt to station S. Under the above assumed conditions, a circuit is established from one terminal of the secondary winding S of the transformer T to the other side of such winding, or from one side of the circuit of the motor M to the other side of such motor circuit if the voltage reducer shown in Fig. 19 is employed, through the conductor 260, switch 261, conductor 262, contact 161, commutator ring 135, one of the H contacts of the commutator ring 135, contact 153, conductor 265, suit-contact-area-engaging plunger contact 221, one of the contact areas 216 of the card eight of hearts (depending upon the end-for-end disposition of that card within the deck holder 20), the metal plate 37 of the bottom 36 of the deck holder, one of the denomination contact areas 219, individual to the eight of hearts (depending upon the end-for-end dispostion of that card within the deck holder 20), the denomination-contact-area-engaging plunger contact 233, conductor 274, contact 173, conductor strip 173c, its associated compression spring 193, plunger contact 173', the metal disc 148 with which the plunger contact 173' engages by way of the perforation 211' which is indicative of the eight of hearts, metal plate 136, its associated contact segment S'', contact 159, conductor 283, the winding of magnet 242 of the "South" ejector unit 47, conductor 285, the brush contact 53 and ejector roller 59 and pressure roller 60 of the "West" ejector unit 47, conductor 286, the pressure roller 60 and ejector roller 59 and brush contact 53 of the "South" ejector unit 47, conductor 287, the brush contact 53 and ejector roller 59 and pressure roller 60 of the "East" ejector unit 47, conductor 288, the pressure roller 60 and ejector roller 59 and brush contact 53 of the "North" ejector unit 47, and the conductor 258. It is to be noted that all of the magnets 248 are normally energized, "normally" being understood to mean during such time as the rollers 59 and 60 of each ejector unit 47 are maintained in engagement with each other while the circuit of the motor M is closed, by reason of the fact that the windings of these magnets are connected to the conductor 289 and to the conductor 285 through the respective pairs of conductors 290 and 291, the return circuit of which the conductor 285 forms a part having been already described as passing through the respective pairs of rollers 59—60 and the return conductor 258. From the description of the circuit peculiar to the eight of hearts, it will be understood that the instant that circuit is closed the armature 241 of the "South" ejector unit 47 will act under the influence of its associated magnet 242 to move the friction roller 56 into engagement with the lowermost card in the deck, namely the eight of hearts, whereupon the normally energized magnet 248, associated with the "South" ejector unit, will serve to move its associated bell-crank lever 244 into locking engagement with the latch bar 246 despite the opposing force exerted by the spring 259. The instant the contact areas 216 and 219 that are individual to the eight of hearts move out of engagement with the plunger contacts 221 and 233 under the influence of the friction roller 56, the magnet 242 is deenergized, but the friction roller 56 is maintained in its position shown at the right in Fig. 4 until such time as the card undergoing ejection has been gripped between the ejector roller 59 and the pressure roller 60 of the "South" ejector unit 47, as shown in Fig. 18, whereupon the circuit through the magnet 248 is opened by reason of the separation of the rollers 59 and 60 of the "South" ejector unit, thus permitting the spring 250 to so move the bell-crank lever 244 as to unlatch the latch bar 246 and permit the friction roller 56 to move by gravity out of contact with the card undergoing ejection and into a position corresponding to the position of the friction roller appearing at the left in Fig. 4. It is to be noted that during such time as the card is being ejected, no one of the magnets 242 controlling the ejecting operation of the friction rollers 56 can be energized regardless of any contact that may be made between the next card to be ejected and its corresponding plunger contacts, associated with the bottom 36 of the deck holder 20, or regardless of what may be the relation of the plunger contacts, carried by the closure 187, to the next row or rows of perforations 211' of the selector. Moreover, it is to be noted that the speed of rotation of the selector 211 is such with respect to the linear displacement of any card that such card, once it is started in its travel of delivery, will be gripped by and passed between the ejector roller 59 and the pressure roller 60 before the next row or rows of perforations 211' move into registration with the plunger contacts of the closure 187. As soon as the card undergoing ejection passes between and clears the rollers 59 and 60, the magnets 248 are again energized, due to the fact that circuits are established through the respective pairs of rollers 59—60, whereupon the apparatus is conditioned for operation with respect to the next card to be ejected in a manner similar to the operation just described with respect to the eight of hearts, the station to which the next card will be delivered being, of course, dependent upon the location of the controlling perforation 211' of the selector 211 with respect to the N'', E'', S'' and W'' contact segments associated with the turntable 134. The cycle of selective operation of the apparatus continues during the time the selector is completing fourteen revolutions, whereupon the circuit of the motor M is automatically opened by reason of the fact that the switch 124 is moved to open-circuit position under the influence of its associated spring 131 at such time as the switch control-disc 120 completes one revolution, the disc being geared to the shaft 105 which rotates the turntable 134 in a ratio of 14 to 1, as previously described. The fourteen revolutions of the selector are deemed ample under the most unfavorable conditions, as when the order of arrangement of the cards in the deck 19 is such with respect to the perforations 211' in the selector 211 that thirteen cards of the same suit are to be delivered to the respective stations N, E, S, and W. Should it be found by experiment, however, that fourteen revolutions of the selector are insufficient to effect a complete deal under the most unfavorable conditions, the situation may be readily met, of course, by increasing the gear ratio between the shafts 105 and 115 so as to obtain the desired number of revolutions of the selector for each revolution of the switch control-disc 120. Under the most favorable conditions, as for example when the order of arrangement of the cards in the deck 19 is such with respect to the perforations 211' in the selector 211 that four cards will be delivered to each of the respective stations per revolution of the selector 211, only three and one-quarter revolutions of the selector will be required to effect the delivery of the fifty-two cards of the deck. Under no circumstances will any one of the magnets 242 be actuated pursuant to the last card-ejecting operation, due to the presence of a facing 297, of insulating material, carried on the lower face of a follower 298 which is adapted to be placed on the deck of cards 19 when they are introduced into the deck holder 20 preparatory to a dealing operation, the follower being of metal and having sufficient weight to retain the cards in a flat condition so as to insure proper engagement of their metallic contact areas with the metal plate 37, and to further insure successive alignment of the cards with the space afforded between the metal plate 37 and the lower end of each side wall 23 of the deck holder, whereby the successive cards may be unobstructedly ejected.

The rules governing the playing of duplicate bridge require the assignment of a "vulnerable" and a "not vulnerable" status to the players in a definite order with respect to the deals as, for example, first deal "Nobody vulnerable", second deal "North and South vulnearable", third deal "East and West vulnerable", fourth deal "All vulnerable". In order to satisfy this requirement when the apparatus is employed in the dealing of predetermined hands for use in the playing of duplicate bridge, the selectors—which may be of as many different patterns as there are possible deals of four different hands each in a deck of cards, and which may be weekly released in grooups of twenty or other quantities for sale to the public by a playing-card or other manufacturer—may be four different colors, for example, green, orange, yellow and red, it being understood that the player's status, when hands are dealt in accordance with the green, orange, yellow and red selectors, shall be, respectively, as follows: "Nobody vulnerable", "North and South vulnerable", "East and West vulnerable", and "All vulnerable", and it being further understood that in each weekly issue of selectors there shall be an equal number of the green, the orange, the yellow, and the red selectors. Such a color scheme as that just described, enables one to readily choose, from any number of selectors that he may have acquired from time to time, the proper selectors to effect the required status of the players for an evening's play. The selectors chosen for use in an evening's play may be temporarily numbered on their backs, so as to enable the bidding of the hands dealt in accordance with such selectors, as well as the score resulting from the play of those hands, to be properly noted on a suitable score pad or sheet for both the first half-play and the second half-play, thus enabling the players, at the end of an evening's play to compare not only partnership scores but also partnership bids. In keeping a record of the bids and scores on the first half-play, the identification number of each selector is observed at the time the selector is introduced into the apparatus and is then noted on the score pad. As the bidding of the hands dealt in accordance with any given selector progresses, the bids are noted on the score pad in a proper relation to the already entered identification number of that selector; and after the playing of the hands has been completed, the score is similarly entered on the score pad. After the first half-play has been completed, the selectors are shuffled preparatory to the beginning of the second half-play. In keeping a record of the bids and scores on the second half-play, it is to be noted that the bids of the hands dealt in accordance with any given selector and the score resulting from the play of those hands are entered on the score pad in a proper relation to each other, and that it is not until after the playing of those hands has been completed is the identifying number of the selector by which the deal was effected to be observed, such observation being made upon removal of the selector from the apparatus whereupon its identifying number is entered in a proper relation to the already recorded bids and score peculiar to that record on the second half-play.

If desired, the selectors may be permanently numbered successively on their backs by the playing-card or other manufacturer for the purpose of facilitating the keeping, as described, of a comparative record of partnership bids and scores, and for the purpose of permanently identifying the selectors so that authorities on the subject of bridge may periodically issue an up-to-date printed publication, in text book or other form, having to do with the par value of the hands, represented by the respective selectors already released, and based on theoretically perfect bidding and theoretically perfect play from both an offensive and a defensive viewpoint.

In some cases it may be desirable to print or otherwise inscribe on the backs of the selectors, at the time they are manufactured, their respective par values, as for example, the theoretically perfect bids of the hands and the score that should result from such hands when played theoretically perfect from both an offensive and a defensive viewpoint.

Instead of printing the par value on the selectors as above mentioned, an expert's analysis of the hands represented by the respective selectors may be recorded thereon in his own words, especially if celluloid is employed as the material from which the selectors are made, inasmuch as that material is readily adapted for use in certain recording processes wherein the sound track is cut in the rotating record blank by a suitable tool which is caused to vibrate during the recording period in accordance with the sound waves peculiar to the subject-matter to be recorded. Once an analysis of the hands of any selector has been recorded, it can be reproduced by the aid of an ordinary phonograph, as will be readily understood by those skilled in the art.

When it is desired to condition the apparatus for dealing the cards to the respective stations without regard to their suit or denominational values, as for example when the apparatus is to be employed in connection with the playing of rubber bridge, the switch 261 is moved from its position shown in Fig. 18 to a bridging position with respect to the conductors 260 and 263, thereby cutting out of circuit the conductor 262, the conductors 264 to 267 and 268 to 280 as well as portions of conductors 281 to 284. The operation of the apparatus is then such that, as the contact arm 198 engages the contacts 204, 205, 206 and 207 by reason of the fact that the shaft 195 is frictionally connected to and rotates with the shaft 138, the magnets 242 of the North, East, South and West ejector units 47 will be energized and deenergized in the order named since the conductors 281 to 284 are connected through conductors 292 to 295 to the contacts 204 to 207 in the manner previously described. It is to be noted that the contacts 204 to 207, which respectively control the operation of the North, East, South and West ejector units 47, are identified as W, N, E, and S, respectively, so that if "North", for example, is selected as the dealer at the beginning of an evening's play, the contact arm 198 may be set in engagement with the proper contact, namely the North contact 205, to effect delivery to East of the first card to be dealt, the remaining cards being delivered in succession to the players in the order of South, West, North, East, and so on until the fifty-two cards have been distributed. During the distribution of the cards, thirteen revolutions of the shaft 195 are required, but inasmuch as this shaft is driven by the shaft 138 which rotates with the turntable 134, it will make fourteen revolutions before coming to rest due to the automatic opening of the circuit of the motor M through the switch 124, as previously described in connection with the operation of the apparatus when employed in dealing predetermined hands. Since the contact arm 198, carried by the shaft 195, will come to rest at its initial starting point, namely, in contact with the North contact 205, it will there serve to indicate, preparatory to the next deal, that North was the previous dealer. Before initiating the next deal, the shaft 195 is moved one-quarter turn, thus bringing its associated contact arm 198 into engagement with the East contact 206 so that when the next deal is initiated the first card will be delivered to the South player. Such quarter-turn advances of the contact arm 198 is resorted to after each deal and prior to the next succeeding deal, with the result that the first card dealt on each deal is delivered to the player next following the dealer.

Aside from the slight modifications shown herein, various other changes may, of course, be resorted to without departing from the spirit of the invention or the scope of the following claims.

What is claimed is:

1. An apparatus for dealing playing cards to selected stations, comprising a deck of cards, each card having an individual characteristic adapted for selective cooperation with card control and ejecting means, a card receptacle for holding the deck of cards, card control means, card ejecting means, said card control means and said card ejecting means being under the control of and responsive to the individual characteristic of each card to effect the delivery to selected stations of individual cards to form predetermined hands, manually controlled means operable at will for rendering said individual characteristic of each card ineffective with respect to said card control means and for conditioning said card ejecting means to effect the delivery to the respective stations of cards to form other than predetermined hands, and station control means operable in synchrony with said card ejecting means pursuant to the operation of said manually controlled means to insure the delivery to a predetermined station of the first card to be dealt from the deck.

2. An apparatus for dealing playing cards to selected stations, comprising a deck of cards, each card having an individual characteristic adapted for selective cooperation with card control and ejecting means, a card receptacle for holding the deck of cards, card control means, card ejecting means, said card control means and said card ejecting means being under the control of and responsive to the individual characteristic of each card to effect the delivery to selected stations of individual cards to form predetermined hands, manually controlled means operable at will for rendering said individual characteristic of each card ineffective with respect to said card control means and for conditioning said card ejecting means to effect the delivery to the respective stations of cards to form other than predetermined hands, station control means operable in synchrony with said card ejecting means pursuant to the operation of said manually controlled means to insure the delivery to a predetermined station of the first card to be dealt from the deck, such predetermined station corresponding to the player next following the imaginary dealer in a definite dealing order of the players, and indicating means functioning upon the termination of a complete dealing operation to indicate the imaginary dealer.

3. An apparatus for dealing playing cards to selected stations, comprising a deck of cards, each card having an individual characteristic adapted for selective cooperation with card control means, a card receptacle for holding the deck of cards, a plurality of card-ejecting devices for delivering the cards to said stations, card control means under the control of and responsive to the individual characteristic of each card to effect the delivery to selected stations of individual cards to form predetermined hands, and manually controlled means operable at will for rendering said individual characteristic of each card ineffective and for establishing a definite order of operation of the card ejecting devices whereby the cards irrespective of their said individual characteristics will be delivered to the respective stations to form other than predetermined hands.

4. An apparatus for dealing playing cards to selected stations, comprising a deck of cards, each card having an individual characteristic adapted for selective cooperation with card control and ejecting means, a card receptacle for holding the deck of cards, electro-responsive card control means, electro-responsive card ejecting means, said card control means and said card ejecting means being under the control of and responsive to the individual characteristic of each card to effect the delivery to selected stations of individual cards to form predetermined hands, said card control and ejecting means including a circuit selector, and manually controlled circuit interrupting means operable at will for rendering said individual characteristic of each card ineffective with respect to said card control means and for conditioning said card ejecting means to effect the delivery to the respective stations of cards to form other than predetermined hands.

5. An apparatus for dealing playing cards to selected stations, comprising a deck of cards, each card having an individual characteristic adapted for selective cooperation with card control means, a card receptacle for holding the deck of cards, a plurality of electro-responsive card-ejecting devices for delivering the cards to said stations, card control means under the control of and responsive to the individual characteristic of each card to effect the delivery to selected stations of individual cards to form predetermined hands, said card control means including a circuit selector, and manually controlled circuit interrupting means operable at will for rendering the individual characteristic of each card ineffective and for establishing a definite order of operation of the card ejecting devices whereby the cards irrespective of their said individual characteristics will be delivered to the respective stations to form other than predetermined hands.

6. An apparatus for delivering predetermined cards to predetermined stations, comprising a supply group of cards each having an individual control characteristic physically differentiating that card from all other cards of said group, a card receptacle for holding said group of cards, and card control and ejecting means under the control of and responsive to the individual control characterstic of successive cards while in supply-group position to effect delivery to predetermined stations respectively of a sub-group of predetermined cards physically differentiating from each other according to their individual control characteristics.

7. An apparatus for delivering predetermined cards to predetermined stations, comprising a supply group of cards each having an individual circuit-control characteristic physically differentiating that card from all other cards of said group, a card receptacle for holding said group of cards, and electro-responsive card control and ejecting means under the control of and responsive to the individual circuit-control characteristic of successive cards while in supply-group position to effect delivery to predetermined stations respectively of a sub-group of predetermined cards physically differentiating from each other according to their individual circuit-control characteristics.

8. An apparatus for delivering predetermined cards to predetermined stations, comprising a supply group of cards each having an individual circuit-control characteristic physicaly differentiating that card from all other cards of said group, a card receptacle for holding said group of cards, and electro-responsive card control and ejecting means under the control of and responsive to the individual circuit-control characteristic of successive cards while in supply-group position to effect delivery to predetermined stations respectively of a sub-group of predetermined cards physically differentiating from each other according to their individual circuit-control characteristics, said card control and ejecting means including a circuit selector having circuit-control characteristics corresponding respectively to the circuit-control characteristics peculiar to said supply group of cards.

9. An apparatus for delivering predetermined cards to predetermined stations, comprising a supply group of cards each having an individual circuit-control characteristic physically differentiating that card from all other cards of said group, a card receptacle for holding said group of cards, and electro-responsive card control and ejecting means under the control of and responsive to the individual circuit-control characteristic of successive cards while in supply-group position to effect delivery to predetermined stations respectively of a sub-group of predetermined cards physically differentiating from each other according to their individual circuit-control characteristics, said card control and ejecting means including a circuit selector having circuit-control characteristics corresponding respectively to the circuit-control characteristics peculiar to said supply group of cards and being operable at one time in one position to insure delivery to said predetermined stations respectively of said sub-group of predetermined cards and being operable at another time in another position to insure delivery to other predetermined stations respectively of said sub-group of predetermined cards.

10. An apparatus for delivering predetermined cards to predetermined stations, comprising a supply group of cards each having an individual control characteristic physically differentiating that card from all other cards of said group, a card receptacle for holding said group of cards, a plurality of card ejecting devices, and card control means under the control of and responsive to the individual control characteristic of successive cards while in supply-group position to render said ejecting devices selectively effective to deliver to predetermined stations respectively a sub-group of predetermined cards physically differentiating from each other according to their individual control characteristics.

11. An apparatus for delivering predetermined cards to predetermined stations, comprising a supply group of cards each having an individual circuit-control characteristic physically differentiating that card from all other cards of said group, a card receptacle for holding said group of cards, a plurality of electro-responsive card ejecting devices, and card control means under the control of and responsive to the individual circuit-control characteristic of successive cards while in supply-group position to render said ejecting devices selectively effective to deliver to predetermined stations respectively a sub-group of predetermined cards physically differentiating from each other according to their individual circuit-control characteristics.

12. An apparatus for delivering predetermined cards to predetermined stations, comprising a supply group of cards each having an individual circuit-control characteristic physically differentiating that card from all other cards of said group, a card receptacle for holding said group of cards, a plurality of electro-responsive card ejecting devices, and card control means under the control of and responsive to the individual circuit-control characteristic of successive cards while in supply-group position to render said ejecting devices selectively effective to deliver to predetermined stations respectively a sub-group of predetermined cards physically differentiating from each other according to their individual circuit-control characteristics, said card control means including a circuit selector having circuit-control characteristics corresponding respectively to the circuit-control characteristics peculiar to said supply group of cards.

13. An apparatus for delivering predetermined cards to predetermined stations, comprising a supply group of cards each having an individual circuit-control characteristic physically differentiating that card from all other cards of said group, a card receptacle for holding said group of cards, a plurality of electro-responsive card ejecting devices, and card control means under the control of and responsive to the individual circuit-control characteristic of successive cards while in supply-group position to render said ejecting devices selectively effective to deliver to predetermined stations respectively a sub-group of predetermined cards physically differentiating from each other according to their individual circuit-control characteristics, said card control means including a circuit selector having circuit-control characteristics corresponding respectively to the circuit-control characteristics peculiar to said supply group of cards and being operable at one time in one position to insure delivery to said predetermined stations respectively of said sub-group of predetermined cards and being operable at another time in another position to insure delivery to other predetermined stations respectively of said sub-group of predetermined cards.

14. An apparatus for dealing predetermined playing cards to predetermined stations, comprising a deck of cards each having an individual control characteristic indicative of its suit and denomination and physically differentiating that card from all other cards of said deck, a card receptacle for holding said deck of cards, card control means, card ejecting means, said card control means and said card ejecting means being under the control of and responsive to the individual control characteristic of each card in succession to effect delivery to predetermined stations respectively of a hand of predetermined cards physically differentiating from each other according to their individual circuit-control characteristics, and manually controlled means operable at will for rendering said individual control characteristic of each card ineffective with respect to said card control means and for conditioning said card ejecting means to effect delivery to the respective stations of cards to form other than predetermined hands.

15. An apparatus for dealing predetermined playing cards to predetermined stations, comprising a deck of cards each having an individual circuit-control characteristic physically differentiating that card from all other cards of said deck, a card receptacle for holding said deck of cards, electro-responsive card control means, electro-responsive card ejecting means, said card control means and said card ejecting means being under the control of and responsive to the individual circuit-control characteristic of each card in succession to effect delivery to predetermined stations respectively of a hand of predetermined cards physically differentiating from each other according to their individual circuit-control characteristics, manually controlled means operable at will for rendering said individual circuit-control characteristic of each card ineffective with respect to said card control means and for conditioning said card ejecting means to effect delivery to the respective stations of cards to form other than predetermined hands.

16. An apparatus for dealing predetermined playing cards to predetermined stations, comprising a deck of cards each having an individual circuit-control characteristic physically differentiating that card from all other cards of said deck, a card receptacle for holding said deck of cards, electro-responsive card control means, electro-responsive card ejecting means, said card control means and said card ejecting means being under the control of and responsive to the individual circuit-control characteristic of each card in succession to effect delivery to predetermined stations respectively of a hand of predetermined cards physically differentiating from each other according to their individual circuit-control characteristics, said card control means including a circuit selector having circuit-control characteristics corresponding respectively to the circuit-control characteristics peculiar to said deck of cards, manually controlled means operable at will for rendering said individual circuit-control characteristic of each card ineffective with respect to said card control means and for conditioning said card ejecting means to effect delivery to the respective stations of cards to form other than predetermined hands.

17. An apparatus for dealing predetermined playing cards to predetermined stations, comprising a deck of cards each having an individual circuit-control characteristic physically differentiating that card from all other cards of said deck, a card receptacle for holding said deck of cards, electro-responsive card control means, electro-responsive card ejecting means, said card control means and said card ejecting means being under the control of and responsive to the individual circuit-control characteristic of each card in succession to effect delivery to predetermined stations respectively of a hand of predetermined cards physically differentiating from each other according to their individual circuit-control characteristics, said card control means including a circuit selector having circuit-control characteristics corresponding respectively to the circuit-control characteristics peculiar to said deck of cards and being operable at one time in one position to insure delivery to said predetermined stations respectively of said hand of predetermined cards and being operable at another time in another position to insure delivery to other predetermined stations respectively of said hand of predetermined cards, and manually controlled means operable at will for rendering said individual circuit-control characteristic of each card ineffective with respect to said card control means and for conditioning said card ejecting means to effect delivery to the respective stations of cards to form other than predetermined hands.

18. In a card sorting machine, a plurality of stations to each of which a sub-group of predetermined cards are to be delivered from a supply group of cards, each having an individual circuit-control card-characteristic, a selector element having circuit-control selector-characteristics corresponding respectively to said circuit-control card-characteristics and grouped in zones corresponding to said stations, the circuit-control selector-characteristics peculiar to any given zone corresponding to the sub-group of cards to be delivered to the station corresponding to that zone, means for effecting cyclic operation of said selector element to establish a control-relation between each circuit-control card-characteristic and its corresponding circuit-control selector-characteristic, and station selectors responsive to said circuit-control card-characteristics and said circuit-control selector-characteristics as they assume control-relations and selectively operated according to the order in which the zones are rendered active by virtue of the control-relations set up between the selector-characteristics included in such zones and the card-characteristics corresponding to said included selector-characteristics.

19. In a card sorting machine, a plurality of stations to each of which a sub-group of predetermined cards are to be delivered from a supply-group of cards, each having an individual circuit-control card-characteristic, a plurality of interchangeable selector elements, each having circuit-control selector-characteristics corresponding respectively to said circuit-control card-characteristics and grouped in zones corresponding to said stations, the circuit-control selector-characteristics peculiar to any given zone of any given selector element being different as a group from the selector characteristics peculiar as a group to the corresponding zone of each of the remaining selector elements and corresponding to the sub-group of cards to be delivered to the station corresponding to said given zone, means for effecting cyclic operation of said selector elements when used individually to establish a control-relation between each circuit-control card-characteristic and its corresponding circuit-control selector-characteristic, and station selectors responsive to said circuit-control card-characteristics and said circuit-control selector-characteristics as they assume control-relations and selectively operated according to the order in which the zones are rendered active by virtue of the control-relations set up between the selector-characteristics included in such zones and the card-characteristics corresponding to said included selector-characteristics.

20. In a card-dealing machine, a plurality of stations to each of which a sub-group of predetermined cards are to be delivered from a supply group of cards, each having an individual circuit-control card-characteristic, a selector element having circuit-control selector-characteristics corresponding respectively to said card-characteristics and grouped in zones corresponding to said stations, the selector-characteristics peculiar to any given zone corresponding to the sub-group of cards to be delivered to the station corresponding to that zone, actuating means for effecting cyclic operation of said selector to establish a control-relation between each card-characteristic and its corresponding selector-characteristic, and means depending for its operation on said actuating means and responsive to said card-characteristics and said selector characteristics as they assume control-relations to effect delivery of predetermined cards to predetermined stations.

21. In a card-dealing machine, a plurality of stations to each of which a sub-group of predetermined cards are to be delivered from a supply-group of cards, each having an individual circuit-control card-characteristic, a plurality of interchangeable selector elements, each having circuit-control selector-characteristics corresponding respectively to said card-characteristics and grouped in zones corresponding to said stations, the selector-characteristics peculiar to any given zone of any given selector being different as a group from the selector-characteristics peculiar as a group to the corresponding zone of each of the remaining selector elements and corresponding to the sub-group of cards to be delivered to the station corresponding to said given zone, actuating means for effecting cyclic operation of said selector elements when used individually to establish a control-relation between each card-characteristic and its corresponding selector-characteristic, and means depending for its operation on said actuating means and responsive to said card-characteristics and said selector-characteristics as they assume control-relations to effect delivery of predetermined cards to predetermined stations.

22. For use in a card-dealing machine of the type including a rotatable selector-element support and of the type adapted to deliver to each of a plurality of stations a sub-group of predetermined cards from a supply-group of cards, each having an individual circuit-control card-characteristic, a selector element adapted to be carried on and rotated by said selector-element support, said selector-element having circuit-control selector-characteristics corresponding respectively to said card-characteristics and grouped in zones corresponding to said stations, the arrangement of the selector characteristics included in any given zone being different from the arrangement of the selector characteristics included in each of the remaining zones of said selector.

23. For use in a card-dealing machine of the type including a rotatable selector-element support and of the type adapted to deliver to each of a plurality of stations a sub-group of predetermined cards from a supply-group of cards, each having an individual circuit-control card-characteristic, a plurality of selector elements, each being adapted to be carried on and rotated by said selector-element support, and each having circuit-control selector-characteristics corresponding respectively to said card-characteristics and grouped in zones corresponding to said stations, the arrangement of selector characteristics included in any given zone of any given selector element being different from the arrangement of the selector-characteristics included in the corresponding zones of each of the remaining selector elements.

24. For use in a card sorting machine of the type including means for effecting cyclic operation of a selector element and of the type adapted to deliver to each of a plurality of stations a sub-group of predetermined cards from a supply-group of cards, each having an individual circuit-control-card-characteristic, a selector element adapted to undergo cyclic operation under the influence of said means, said selector element having circuit-control selector-characteristics corresponding respectively to said card-characteristics and grouped in zones corresponding to said stations, the arrangement of the selector characteristics included in any given zone being different from the arrangement of the selector characteristics included in each of the remaining zones of said selector.

25. For use in a card sorting machine of the type including means for effecting cyclic operation of a selector element and of the type adapted to deliver to each of a plurality of stations a sub-group of predetermined cards from a supply-group of cards, each having an individual circuit-control card-characteristic, a plurality of selector elements, each being adapted to undergo cyclic operation under the influence of said means, and each having circuit-control selector-characteristics corresponding respectively to said card-characteristics and grouped in zones corresponding to said stations, the arrangement of selector characteristics included in any given zone of any given selector element being different from the arrangement of the selector characteristics included in the corresponding zones of each of the remaining selector elements.

26. In a card sorting machine, a plurality of stations to each of which a sub-group of predetermined cards are to be delivered from a supply-group of cards, each having an individual circuit-control card-characteristic, a selector element having circuit-control selector-characteristics corresponding respectively to said circuit-control card-characteristics and grouped in zones corresponding to said stations, the circuit-control selector-characteristics peculiar to any given zone corresponding to the sub-group of cards to be delivered to the station corresponding to that zone, means for effecting cyclic operation of said selector element to establish a control-relation between each circuit-control card-characteristic and its corresponding circuit-control selector-characteristic, and station-selector-means responsive to said circuit-control card-characteristics and said circuit-control selector-characteristics as they assume control-relations and operated according to the order in which the zones are rendered active by virtue of the control-relations set up between the selector-characteristics included in such zones and the card-characteristics corresponding to said included selector-characteristics.

27. In a card sorting machine, a plurality of stations to each of which a sub-group of predetermined cards are to be delivered from a supply-group of cards, each having an individual circuit-control card-characteristic, a plurality of interchangeable selector elements, each having circuit-control selector-characteristics corresponding respectively to said circuit-control card-characteristics and grouped in zones corresponding to said stations, the circuit-control selector-characteristics peculiar to any given zone of any given selector element being different as a group from the selector characteristics peculiar as a group to the corresponding zone of each of the remaining selector elements and corresponding to the sub-group of cards to be delivered to the station corresponding to said given zone, means for effecting cyclic operation of said selector elements when used individually to establish a control-relation between each circuit-control card-characteristic and its corresponding circuit-control selector-characteristic, and station-selector-means responsive to said circuit-control card-characteristics and said circuit-control selector-characteristics as they assume control-relations and operated according to the order in which the zones are rendered active by virtue of the control-relations set up between the selector-characteristics included in such zones and the card-characteristics corresponding to said included selector-characteristics.

WILLIAM C. MILES.